United States Patent
Guénot et al.

(10) Patent No.: US 12,152,937 B2
(45) Date of Patent: Nov. 26, 2024

(54) OPTICAL SPECTROMETER AND METHOD FOR SPECTRALLY RESOLVED TWO-DIMENSIONAL IMAGING OF AN OBJECT

(71) Applicant: Diego Guénot, Lund (SE)

(72) Inventors: Diego Guénot, Lund (SE); Olle Lundh, Lund (SE)

(73) Assignee: MANTIS PHOTONICS AB (SE)

( * ) Notice: Subject to any disclaimer, the term of this patent is extended or adjusted under 35 U.S.C. 154(b) by 204 days.

(21) Appl. No.: 17/623,291

(22) PCT Filed: Jun. 18, 2020

(86) PCT No.: PCT/SE2020/050637
§ 371 (c)(1),
(2) Date: Dec. 28, 2021

(87) PCT Pub. No.: WO2020/263161
PCT Pub. Date: Dec. 30, 2020

(65) Prior Publication Data
US 2022/0364918 A1 Nov. 17, 2022

(30) Foreign Application Priority Data

Jun. 28, 2019 (SE) .................... 1950813-4

(51) Int. Cl.
*G01J 3/28* (2006.01)
*G01J 3/02* (2006.01)
(Continued)

(52) U.S. Cl.
CPC .......... *G01J 3/2823* (2013.01); *G01J 3/0208* (2013.01); *G01J 3/0218* (2013.01); *G01J 3/0256* (2013.01);
(Continued)

(58) Field of Classification Search
CPC ...... G01J 3/2823; G01J 3/0208; G01J 3/0218; G01J 3/0256; G01J 3/14; G01J 3/1838;
(Continued)

(56) References Cited

U.S. PATENT DOCUMENTS

2003/0059820 A1* 3/2003 Vo-Dinh ............. B01J 19/0046
506/3
2003/0223248 A1* 12/2003 Cronin ................. G01N 21/255
362/555
(Continued)

FOREIGN PATENT DOCUMENTS

WO 2019025759 2/2019

OTHER PUBLICATIONS

Cu-Nguyen et al., "Compact tunable hyperspectral imaging system" 2014 IEEE 27th International Conference on Micro Electro Mechanical Systems, San Francisco, CA, 2014, p. 1167-1170.
(Continued)

*Primary Examiner* — Md M Rahman
(74) *Attorney, Agent, or Firm* — McDonald Hopkins LLC

(57) ABSTRACT

The disclosure relates to an optical spectrometer for spectrally resolved two-dimensional imaging of an object, comprising a dispersing device arranged to disperse radiation from object, a multi-lens array arrangement arranged to receive the dispersed radiation from the dispersing device, a two-dimensional detector arranged to receive 5 the dispersed radiation as directed by the multi-lens array arrangement, wherein the optical spectrometer further comprises a collimating arrangement for collimating the radiation from object before the radiation reaches the dispersing device, the collimating arrangement comprising a diffusing plate for
(Continued)

diffusing the radiation and an optical micro-channel arranged to receive the diffused radiation comprising a plurality 10 of parallel and linear optical micro-channels directed towards the dispersing device. The disclosure further relates to a method for spectrally resolved two-dimensional imaging of an object.

10 Claims, 2 Drawing Sheets

(51) Int. Cl.
  *G01J 3/14* (2006.01)
  *G01J 3/18* (2006.01)
(52) U.S. Cl.
  CPC ............... *G01J 3/14* (2013.01); *G01J 3/1838* (2013.01); *G01J 2003/2826* (2013.01)
(58) Field of Classification Search
  CPC ............. G01J 2003/2826; G01J 3/0205; G01J 3/0262; G01J 3/18; G01J 3/443
  USPC ........................................................ 356/328
  See application file for complete search history.

(56) References Cited

U.S. PATENT DOCUMENTS

| | | | |
|---|---|---|---|
| 2004/0017981 A1* | 1/2004 | Jovanovich | G02B 6/3831 385/60 |
| 2005/0161669 A1* | 7/2005 | Jovanovich | B01L 9/527 257/727 |
| 2008/0025028 A1* | 1/2008 | Gloisten | F21V 29/713 362/240 |
| 2013/0235249 A1* | 9/2013 | Shimbo | G01J 3/1804 348/335 |
| 2016/0011387 A1* | 1/2016 | Arai | G02B 3/04 385/33 |
| 2018/0202862 A1 | 7/2018 | Jean-Ruel et al. | |
| 2019/0025121 A1 | 1/2019 | Manch et al. | |

OTHER PUBLICATIONS

Cu-Nguyen et al., "An imaging spectrometer employing tunable hyperchromatic microlenses" Light: Science & Applications, 2016.
Patent Cooperation Treaty (PCT), International Search Report and Written Opinion for Application PCT/SE2020/050637 filed on Jun. 18, 2020, mailed Jul. 15, 2020, International Searching Authority, SE.
Swedish Patent and Registration Office, Swedish Search Report for Application No. 1950813-4, mailed Jan. 13, 2020, Sweden.

* cited by examiner

OPTICAL SPECTROMETER AND METHOD FOR SPECTRALLY RESOLVED TWO-DIMENSIONAL IMAGING OF AN OBJECT

CROSS-REFERENCE TO RELATED APPLICATION

This application is a 35 U.S.C. § 371 national stage application of PCT Application No. PCT/SE2020/050637 filed on Jun. 18, 2020, entitled "OPTICAL SPECTROMETER AND METHOD FOR SPECTRALLY RESOLVED TWO-DIMENSIONAL IMAGING OF AN OBJECT," which claims priority to Swedish Patent Application No. 1950813-4 filed on Jun. 28, 2019, each of which are incorporated herein in their entirety by reference.

FIELD OF THE INVENTION

The present invention relates to an optical spectrometer for spectrally resolved two-dimensional imaging of an object and a method for spectrally resolved two-dimensional imaging of an object More specifically, the disclosure relates to an optical spectrometer for spectrally resolved two-dimensional imaging of an object and a method for spectrally resolved two-dimensional imaging of an object as defined in the introductory parts of claim 1 and claim 10.

BACKGROUND ART

Spectrometers are used for many purposes such as sensors in industrial processes, satellite imaging, environmental studies and laboratory research.

Spectrometers collects radiation and divides it into its spectral components that is characteristic for the object emitting, absorbing or scattering the radiation. These instruments generally include some type of spectrally selective element to separate wavelengths of radiation received from the object, and a lens to focus or concentrate the radiation onto an imaging sensor array. Prior art spectrometers do, however, have some problems. Prior art spectrometers able to measure with high resolution are often larger than what is practical for use in many portable applications. The cost of prior spectrometers can also be greater than what is acceptable for the application.

In some applications, it is desired to record spectroscopic information in two dimensions to map spectroscopic data of an object resolved in two dimensions. For that purpose imaging spectrometers have been developed to map spectroscopic data in a grid, much like an ordinary image where each pixel includes spectroscopic data. These imaging spectrometers, also called hyperspectral cameras, however, have several issues.

They often require a scanning technology, meaning that an element must scan the image point-by-point or line-by-line. This scanning requires complex mechanics and the scanning takes at least some tens of milliseconds, which makes them inappropriate for imaging objects with quickly evolving dynamic or in rough environments. The complex mechanics for scanning is expensive and sensitive to movement during imaging making the spectrometer expensive and fragile.

Some imaging spectrometers have cameras, which are able to record the spectrum of a 2D image in a single acquisition, e.g. snapshot hyperspectral cameras, removing the need of scanning mechanics. These cameras, however, use special absorption filters with limited spatial resolution and they are expensive.

There is thus a need in the industry for an improved imaging spectrometer with improved spatial resolution able to make a quick measurement without scanning technology, while being small, rugged and low in cost.

SUMMARY

It is an object to mitigate, alleviate or eliminate one or more of the above-identified deficiencies in the art and disadvantages singly or in any combination and solve at least the above-mentioned problem. According to a first aspect there is provided an optical spectrometer for spectrally resolved two-dimensional imaging of an object, comprising a dispersing device arranged to disperse radiation from object and a multi-lens array arrangement arranged to receive the dispersed radiation from the dispersing device. A two-dimensional detector is arranged to receive the dispersed radiation as directed by the multi-lens array arrangement, the two-dimensional detector being arranged at a predetermined distance from the multi-lens array arrangement. The optical spectrometer further comprises a collimating arrangement for collimating the radiation from the object before the radiation reaches the dispersing device. The collimating arrangement comprises a diffusing plate for diffusing the radiation and an optical micro-channel component arranged to receive the diffused radiation comprising a plurality of parallel and linear optical micro-channels directed towards the dispersing device.

The collimating arrangement solves a problem of previous trials with this type of spectrometer that the pattern spectra from the multi-lens array arrangement is inferred on the two-dimensional detector. When using only collimated light, the signal strength is reduced significantly, the signal may be reduced by as much as 99.9%, but the problem with inferred light is overcome as the radiation reaching the multi-lens array arrangement will be collimated so that each pixel will reflect a pixel in an image of the imaged object. A compact functional imaging spectrometer without scanning mechanics and without filter limiting spatial resolution has thus been achieved that is relatively simple, inexpensive and rugged. The reduced signal strength caused by the collimating arrangement may be remedied by having a strong radiation source for radiating the imaged object, like a pulsed laser, thereby increasing the radiation reflected by the object. A more sensitive two-dimensional detector with increased signal-to-noise ratio may also be a way of being able to use the weaker signal as it is.

According to some embodiments, the micro-channel component comprises capillary arrays as e.g. black glass. Only radiation travelling in the direction of the parallel micro-channels will make it through the micro-channel component, thus collimating the radiation.

According to some embodiments, the micro-channel component is a fiber-optical plate, preferably with a numerical aperture of significantly smaller than the numerical aperture of the lenses of the multi-lens array arrangement so that the resolution of the spectrometer is limited by the multi-lens array arrangement and not by the micro-channel component. The fiber-optical plate will also collimate the radiation into parallel radiation.

According to some embodiments, the multi-lens array arrangement is oriented at an angle with respect to the dispersing device. The angle is 17-27 degrees, preferably 22.5 degrees. As the dispersing device will diffract the radiation linearly, one spectrum of one lens in the multi-lens array arrangement may overlap on the detector with the spectrum of a neighboring lens. However, by tilting the multi-lens array arrangement relative the dispersing device the spectrum of focused by each lens will be recorded as tilted on the two-dimensional detector and thereby not overlap the next one.

According to some embodiments, the optical micro-channel component is further arranged to spectrally filter the radiation so that only radiation that is of interest is let through. This may be used to limit the length of the spectrum from each lens on the detector, as a reduced spectral band of the radiation will result in a shorter spectrum.

According to some embodiments, the micro-channel component is arranged with its micro-channels parallel to a propagation path of the radiation and/or with its micro-channels arranged perpendicular to the diffusing plate and the dispersing device to collect as much radiation as possible from representing the object that is to be imaged.

According to some embodiments, the diffusing plate is arranged to distribute radiation in a Gaussian or square distribution, preferably wider than the numerical aperture of the imaging system. This will ensure a good diffusing effect of the diffusing plate.

According to some embodiments, the dispersing device is a component comprised in the group consisting of a transmission grating, a holographic grating only transmitting the first diffraction order, and a grism. The important feature is that the dispersing device diffract the radiation in its spectral components.

According to some embodiments, the collimating arrangement further comprises a collimating lens between the object and the diffusing plate with a narrower distribution for increasing the transmission through the collimating arrangement. This will increase the signal strength, which may be important as the micro-channel plate heavily reduces the signal.

According to some embodiments, the optical micro-channel component comprises a lens or a lens package for directing radiation from the object onto the collimating arrangement. This will increase the imaging capabilities of the optical spectrometer.

According to some embodiments, the multi-lens array arrangement is a shack Hartmann micro-lens array, an achromatic multi-wave lateral shearing interferometer grating or any wave-front sensitive component.

According to some embodiments, the two-dimensional detector is a detector comprised in the group consisting of a charge coupled device array, a complementary metal-oxide-semiconductor detector, and an indium gallium arsenide detector or any light sensitive detector.

According to a second aspect there is provided a method for spectrally resolved two-dimensional imaging of an object, comprising the step of, dispersing radiation from object by a dispersing device, receiving the dispersed radiation from the dispersing device at a multi-lens array arrangement arranged to, receive the dispersed radiation as directed by the multi-lens array arrangement at a two-dimensional detector, wherein method further comprises the steps of a collimating the radiation from object before the radiation reaches the dispersing device by a collimating arrangement, the collimating arrangement diffusing the radiation by a diffusing plate and collimating the diffused radiation by an optical micro-channel component comprising a plurality of parallel and linear optical micro-channels directed towards the dispersing device.

Effects and features of the second aspect are to a large extent analogous to those described above in connection with the first aspect. Embodiments mentioned in relation to the first aspect are largely compatible with the second aspect.

A further scope of applicability of the present invention will become apparent from the detailed description given below. However, it should be understood that the detailed description and specific examples, while indicating preferred embodiments of the invention, are given by way of illustration only. Various changes and modifications within the scope of the invention will become apparent to those skilled in the art from the detailed description.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present invention will be more fully appreciated by reference to the following illustrative and non-limiting detailed description of example embodiments of the present invention, when taken in conjunction with the accompanying drawings.

DETAILED DESCRIPTION

The present invention will now be described with reference to the accompanying drawings, in which currently preferred example embodiments of the invention are shown. This invention may, however, be embodied in many different forms and should not be construed as limited to the herein disclosed embodiments. The disclosed embodiments are provided to fully convey the scope of the invention to the skilled person.

Figure 1:
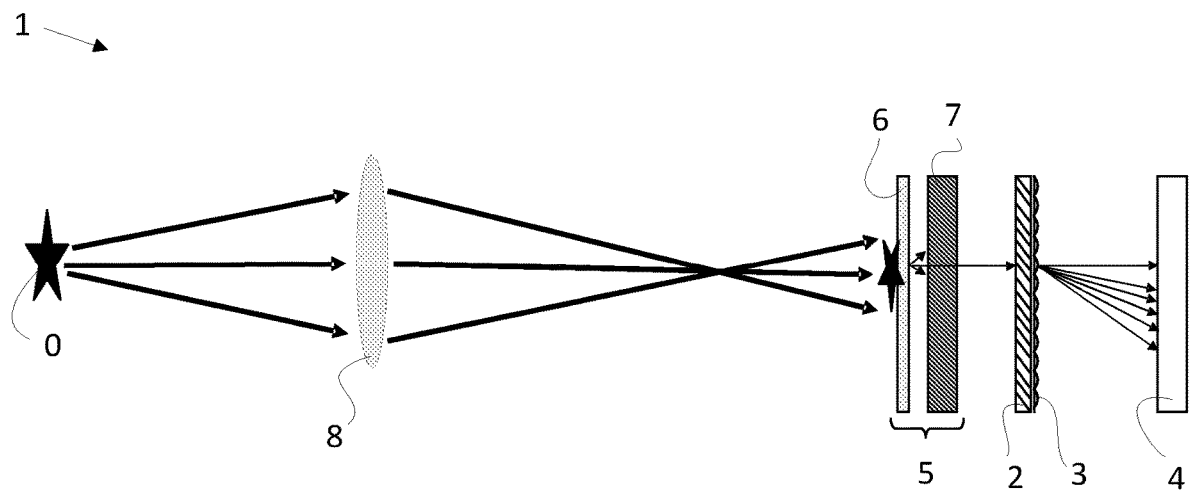
FIG. 1 shows a schematic view of an optical spectrometer for spectrally resolved two-dimensional imaging of an object.

FIG. 1 shows an optical spectrometer 1 for spectrally resolved two-dimensional imaging of an object 0. A lens 8 images the radiation from the object 0 onto a collimating arrangement 5 for collimating the radiation from object 0 before the radiation continues to a dispersing device 2. The collimating arrangement 5 comprises a diffusing plate 6 for diffusing the radiation and an optical micro-channel component 7 arranged to receive the diffused radiation. The optical micro-channel component 7 comprises a plurality of parallel and linear optical micro-channels directed towards the dispersing device 2. Only radiation traveling in the direction of the parallel linear optical micro-channels will pass the optical micro-channel component 7. The radiation will thus be parallel and collimated after the optical micro-channel component 7.

The collimated radiation will thereafter arrive at the dispersing device 2 arranged to disperse the radiation. The dispersed radiation continues to a multi-lens array arrangement 3 arranged to receive the dispersed radiation from the dispersing device 2. As seen in FIG. 1 the multi-lens array arrangement 3 is placed very close to the dispersing device 2 to make the design of the optical spectrometer compact and avoid blurring of the spectrally dispersed image. A two-dimensional detector 4 is arranged to receive the dispersed radiation as directed by the multi-lens array arrangement 3. The two-dimensional detector 4 is arranged at a predetermined distance from the multi-lens array arrangement 3, wherein the predetermined distance is related to the focal length of the lenses in the multi-lens array arrangement 3 so that the dispersed radiation will be in focus on the two-dimensional detector 4.

The micro-channel component 7 may comprise capillary arrays as e.g. in so called black glass. The micro-channel component 7 may, however, also be a fiber-optical plate, with a numerical aperture of significantly smaller than the numerical aperture of the lenses of the multi-lens array arrangement 3 so as to not affect the resolution of the two-dimensional detector 4 and the spectrometer. According to some embodiments, the optical micro-channel component 7 is further arranged to spectrally filter the radiation. The micro-channel component 7 is further arranged with its micro-channels parallel to a propagation path of the radiation and/or with its micro-channels arranged perpendicular to the diffusing plate 6 and the dispersing device 2.

Figure 3:
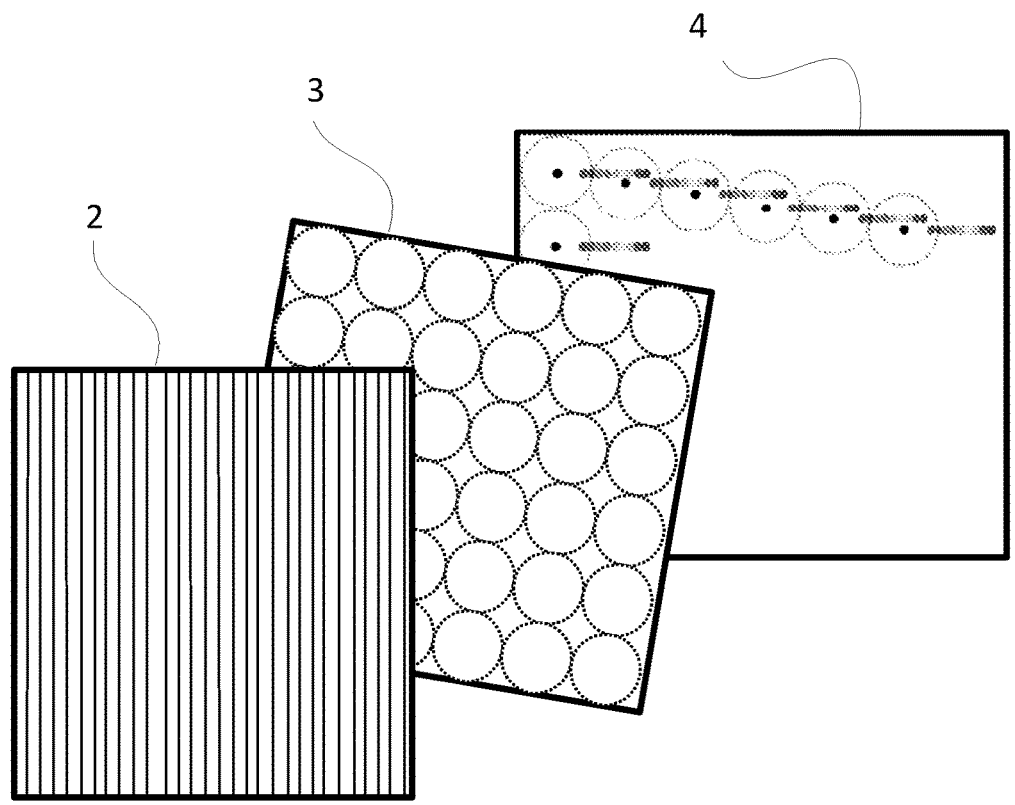
FIG. 3 is a schematic view to illustrate orientation of the multi-lens array arrangement with respect to the dispersing device.

The multi-lens array arrangement 3 is preferably oriented at an angle with respect to the dispersing device so as to not have the dispersed radiation spectrum from one lens of the multi-lens array arrangement 3 to overlap the one from a neighboring lens. This is illustrated in FIG. 3. The angle may be 17-27 degrees, preferably 22.5 degrees. The diffusing plate 6 is arranged to distribute radiation in a Gaussian or square distribution, preferably a wider than the numerical aperture of the imaging system 8.

As can be seen in FIG. 3, the orientation of the multi-lens array arrangement 3 at an angle with respect to the dispersing device 2 makes the individual spectrum from each lens in the micro-lens arrangement 3 to not overlap as they are projected to different levels of the two-dimensional detector 4 as a result of the angled orientation. FIG. 3 also illustrates how the object is imaged, with a two-dimensional map where each "pixel" is a spectrum. The imaged object can thereby be spectrally analyzed for each spatial location. The resolution of the spectral two-dimensional image is limited by the density of lenses on the micro-lens arrangement 3.

The spectral resolution will now be discussed with some examples. According to the Rayleigh criterion, two wavelengths can be distinguished if their separation on the sensor is more than the point spread function of the micro-lens. The grating law for first order gives that, $\sin(\alpha) = \lambda/a$, where $a$ is the grating period.

The focal spot size is: $w_0 = 1.22 * \lambda f/D$, where D is the micro lens diameter.

Given that two wavelengths can be distinguished if $\Delta x$, the separation between these wavelengths at the sensor is larger than the focal spot size, i.e. $\Delta x > w_{0j}$. Therefore, two wavelengths can be distinguished if they are diffracted by the grating at angle of $\alpha$ and $\alpha'$ separated by, $\alpha - \alpha' = w_0/f = 1.22 * \lambda/D$ and, $\alpha = \lambda/a$.

For example, setting $a = 3.333$ μm, $\lambda = 0.8$ μm, $f = 3.7$ mm, and $D = 300$ μm we get a resolution of $\Delta\lambda = 1.22 * \lambda a/D = 11$ nm.

By the formula for the spectral resolution $\Delta\lambda = 1.22 * \lambda a/D$ two options are available for increasing the resolution. Either the micro-lens diameter can be increased at the cost of a reduction of the spatial resolution, or the grating period $a$ can be decreased, however optical aberrations in the lens quickly emerge and limits the possibilities. A further option is to use a grism 10, i.e. the combination of a prism 11 and a grating 2.

Figure 2:
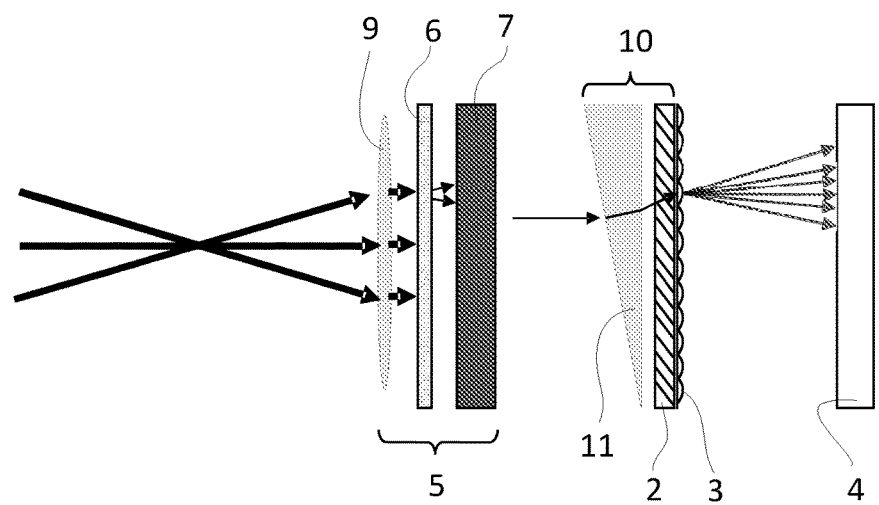
FIG. 2 shows the schematic view of an optical spectrometer with some added components to increase signal strength and spectral resolution.

The dispersing device 2 may as mentioned above be a transmission grating 2, a holographic grating only transmitting the first diffraction order or a grism 10 for increased resolution. An embodiment using a grism 10 is disclosed in FIG. 2. The grism 10 comprises a prism 11 and a grating 2 and will increase the spectral resolution of the optical spectrometer by a factor 3. FIG. 2 further discloses a collimating arrangement 5 comprising a collimating lens 9 between the object 0 and the diffusing plate 6 with a narrower distribution for increasing the transmission through the collimating arrangement and thereby increase the signal strength. This embodiment will thus increase both the resolution and the signal strength compared to the embodiment shown in FIG. 1.

With reference to FIGS. 1-3, the multi-lens array arrangement 3 is a Shack-Hartmann micro-lens array, an achromatic multi-wave lateral shearing interferometer grating or any wavefront sensitive component. The two-dimensional detector 4 is typically a Charge Coupled Device (CCD) array, a Complementary Metal-Oxide-Semiconductor (CMOS) detector, an Indium Gallium Arsenide (InGaAs) detector or any other type of light sensitive detector.

Figure 4:
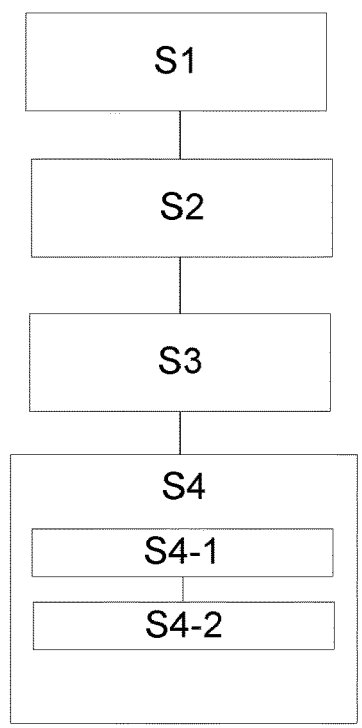
FIG. 4 shows block flow chart representing the method according to the present invention.

With reference to FIG. 4, the second aspect of this disclosure shows a method for spectrally resolved two-dimensional imaging of an object 0, comprising the step of, 51 dispersing radiation from object 0 by a dispersing device 2, S2 receiving the dispersed radiation from the dispersing device 2 at a multi-lens array arrangement 3 arranged to, S3 receiving the dispersed radiation as directed by the multi-lens array arrangement 3 at a two-dimensional detector 4, wherein method further comprises the steps of a S4 collimating the radiation from object 0 before the radiation reaches the dispersing device 2 by a collimating arrangement 5, the collimating arrangement 5 diffusing S4-1 the radiation by a diffusing plate 6 and collimating S4-2 the diffused radiation by an optical micro-channel component 7 comprising a plurality of parallel and linear optical micro-channels directed towards the dispersing device 2.

The person skilled in the art realizes that the present invention is not limited to the preferred embodiments described above. The person skilled in the art further realizes that modifications and variations are possible within the scope of the appended claims. For example, further additional, variations to the disclosed embodiments can be understood and effected by the skilled person in practicing the claimed invention, from a study of the drawings, the disclosure, and the appended claims.

The invention claimed is:

1. An optical spectrometer for spectrally resolved two-dimensional imaging of an object, comprising a dispersing device configured to disperse radiation from the object, a multi-lens array arrangement configured to receive the dispersed radiation from the dispersing device, a two-dimensional detector configured to receive the dispersed radiation as directed by the multi-lens array arrangement, wherein the optical spectrometer further comprises a collimating arrangement collimating the radiation from the object before the radiation reaches the dispersing device, the collimating arrangement comprising a diffusing plate diffusing the radiation and an optical micro-channel component configured to receive the diffused radiation comprising a plurality of parallel and linear optical micro-channels directed towards the dispersing device.

2. The optical spectrometer according to claim 1, wherein the micro-channel component comprises capillary arrays.

3. The optical spectrometer according to claim 1, wherein the micro-channel component is a fiber-optical plate, with a numerical aperture significantly smaller than the numerical aperture of the lenses of the multi-lens array arrangement.

4. The optical spectrometer according to claim 1, wherein the multi-lens array arrangement is oriented at an angle with respect to the dispersing device.

5. The optical spectrometer according to claim 4, wherein the angle is 17-27 degrees.

6. The optical spectrometer according to claim 1, wherein the micro-channel component is arranged with its micro-channels parallel to a propagation path of the radiation and/or with its micro-channels arranged perpendicular to the diffusing plate and the dispersing device.

7. The optical spectrometer according to claim 1 wherein the dispersing device is a component comprised in the group consisting of a transmission grating, a holographic grating only transmitting the first diffraction order, and a grism.

8. The optical spectrometer according to claim 1, wherein the collimating arrangement further comprises a collimating lens between the object and the diffusing plate with a narrower distribution for increasing the transmission through the collimating arrangement.

9. The optical spectrometer according to claim 1, further comprising a lens or a lens package for directing radiation from the object onto the collimating arrangement.

10. A method for spectrally resolved two-dimensional imaging of an object, comprising the step of,
dispersing radiation from the object by a dispersing device,
receiving the dispersed radiation from the dispersing device at a multi-lens array arrangement arranged to,
receiving the dispersed radiation as directed by the multi-lens array arrangement at a two-dimensional detector,
wherein method further comprises the steps of
collimating the radiation from the object before the radiation reaches the dispersing device by a collimating arrangement,
the collimating arrangement diffusing the radiation by a diffusing plate, and collimating the diffused radiation by an optical micro-channel component comprising a plurality of parallel and linear optical micro-channels directed towards the dispersing device.

* * * * *